United States Patent [19]

Sasaki

[11] E Patent Number: Re. 32,126

[45] Reissued Date of Patent: Apr. 29, 1986

[54] TONER IMAGE PRESSURE-FIXING DEVICE

[75] Inventor: Yoshitaka Sasaki, Kumagaya, Japan

[73] Assignee: Hitachi Metals, Ltd., Japan

[21] Appl. No.: 324,028

[22] Filed: Nov. 23, 1981

Related U.S. Patent Documents

Reissue of:

[64] Patent No.: 4,259,920
Issued: Apr. 7, 1981
Appl. No.: 103,104
Filed: Dec. 13, 1979

U.S. Applications:

[63] Continuation of Ser. No. 882,148, Feb. 28, 1978, abandoned.

[30] Foreign Application Priority Data

| | | | |
|---|---|---|---|
| Aug. 5, 1977 | [JP] | Japan | 52-93426 |
| Aug. 17, 1977 | [JP] | Japan | 52-97881 |
| Aug. 17, 1977 | [JP] | Japan | 52-97882 |

[51] Int. Cl.[4] ..... G03G 15/20

[52] U.S. Cl. ..... 100/158 R; 118/116; 430/98

[58] Field of Search ..... 100/155, 158 R, 162 R, 100/162 B, 170, 176, 160, 171, 158 C; 219/469–471, 216, 388, 244; 156/580, 582; 432/60; 355/3 FU; 101/152, 153; 118/60, 70, 101, 116, 117, 653, 114; 68/257, 258, 250, 251, 260; 427/365, 22, 364, 361; 68/250, 251, 260; 100/171, 158 C; 430/98, 99

[56] References Cited

U.S. PATENT DOCUMENTS

| | | | |
|---|---|---|---|
| 1,228,178 | 5/1917 | Brooker | 100/171 |
| 2,212,820 | 8/1940 | Barber | 101/153 |
| 3,001,390 | 9/1961 | Zimmer | 100/176 X |
| 3,189,729 | 6/1965 | Lusebrink | 219/469 |
| 3,343,484 | 9/1967 | Dahlgren | 118/262 |
| 3,647,525 | 3/1972 | Dahlgren | 118/246 |
| 3,736,869 | 6/1973 | Motter et al. | 101/153 |
| 3,874,843 | 4/1975 | Fujimoto | 427/22 |
| 3,874,894 | 4/1975 | Pedersen | 430/98 |
| 3,945,726 | 3/1976 | Ito et al. | 219/216 X |
| 3,990,391 | 11/1976 | Singh | 118/116 |
| 4,022,122 | 5/1977 | Moser et al. | 100/158 R |
| 4,104,963 | 8/1978 | Fortman | 100/176 |
| 4,192,229 | 3/1980 | Tsunoi et al. | 100/158 R |
| 4,235,166 | 11/1980 | Tsunoi | 100/158 R |

FOREIGN PATENT DOCUMENTS

| | | | |
|---|---|---|---|
| 863274 | 2/1971 | Canada . | |
| 2341530 | 2/1975 | Fed. Rep. of Germany . | |
| 2550195 | 5/1976 | Fed. Rep. of Germany . | |
| 2628957 | 1/1977 | Fed. Rep. of Germany . | |
| 2607271 | 4/1977 | Fed. Rep. of Germany | 427/14.1 |
| 2652731 | 5/1977 | Fed. Rep. of Germany . | |
| 40351 | of 1976 | Japan . | |

*Primary Examiner*—Philip R. Coe
*Attorney, Agent, or Firm*—Finnegan, Henderson, Farabow, Garrett & Dunner

[57] ABSTRACT

A toner image pressure-fixing device has a pair of pinch rolls arranged in rolling engagement with each other to provide a nip through which a carrier sheet with a deposit of toner particles thereon is passed to fix the deposit to the carrier sheet by pressure. One of the pinch rolls is of a diameter smaller than that of the other and is solid while the other pinch roll is hollow. The small-diameter pinch roll is resiliently urged against the large-diameter pinch roll by leaf springs and is backed up by a single back-up roll which is disposed on the side of the small-diameter pinch roll substantially diametrically opposite to the large-diameter pinch roll and is resiliently urged against the small-diameter pinch roll whereby the small-diameter pinch roll is prevented from being deflected by pressure produced when a carrier sheet is passed through the nip between the pinch rolls.

19 Claims, 5 Drawing Figures

TONER IMAGE PRESSURE-FIXING DEVICE

Matter enclosed in heavy brackets [ ] appears in the original patent but forms no part of this reissue specification; matter printed in italics indicates the additions made by reissue.

This is a continuation, of application Ser. No. 882,148, filed Feb. 28, 1978, abandoned.

The present invention relates to an improvement in a device for use in an electronic duplicator, a facsimile, an output printer of a computor or the like to fix a toner image to a carrier sheet such as photosensitive paper, ordinary paper or the like. More particularly, the invention relates to an improvement in a device of the class specified above and which is of the type that comprises a pair of pinch rolls disposed in rolling engagement with each other to provide a nip through which a carrier sheet with a deposit of toner particles thereon is passed to fix the deposit to the carrier sheet by pressure produced at the nip.

A toner image pressure-fixing device has been known which had a pair of solid steel pinch rolls of substantially the same diameter. Adjacent ends of the rolls were rotatably supported by a set of bearings mounted respectively on the members which were hinged one to the other so that the bearings and thus the rolls are movable toward and away from each other. Compression coil springs were used to urge one of the pinch rolls against the other. The rolls were disposed relative to each other such that the roll axes extend at an angle with respect to each other. Due to resilient deformation and deflection produced in both pinch rolls, the contact between the two rolls occurred along a generally spiral line.

The force to urge one of the two rolls against the other was so adjusted as to obtain a clear toner image fixed to a carrier sheet. It was found that a pressure of from 20 to 50 kg per unit length (cm) of a toner image was required to fix the toner image to a sheet of paper solely by pressure. In the case of a carrier sheet of B4 size, the toner image pressure-fixing device of the prior art discussed was required to apply a total force of 900 kg to the carrier sheet. The space required to install a roll pressing mechanism of the type that used compression coil springs was of a volume approximately equal to the total volume of two pinch rolls. Thus, there has been a requirement for an improved toner image pressure-fixing device which is small-sized as a whole and in which the necessary total pressure force is decreased to decrease the power force required to drive the rolls and the space required for the installation of the roll pressing mechanism is also decreased to decrease the entire machine size.

It is an object of the present invention to provide an improved toner image pressure-fixing device in which the area of contact between a pair of pinch rolls is reduced to decrease the total pressure force necessary to fix a toner image to a carrier sheet for thereby decreasing the power force required to drive the rolls, and in which roll deflection is prevented by a simple means.

It is another object of the present invention to provide an improved toner image pressure-fixing device of the class specified above and which is of a reduced weight as compared with the prior art device.

It is a further object of the present invention to provide an improved toner image pressure-fixing device of the class specified above and which is of a reduced size as compared with the prior art device.

According to the present invention, there is provided a device for fixing a toner image to a carrier sheet by pressure, comprising a pair of pinch rolls having axes extending substantially parallel to each other, the pinch rolls being disposed in rolling engagement with each other to provide a nip through which a carrier sheet with a deposit of toner particles thereon is passed to fix the toner particles to the carrier sheet, wherein one of the pinch rolls is of a diameter smaller than that of the other, and a back-up roll is provided in rolling engagement with the small-diameter pinch roll.

The back-up roll may preferably have an axial dimension smaller than those of said pinch rolls.

The back-up roll may preferably be disposed relative to the small-diameter pinch roll such that the axis of the back-up roll extends at an angle relative to the axis of the small-diameter pinch roll.

The large-diameter pinch roll may preferably be hollow and the small-diameter pinch roll may preferably be solid. Preferably, the large-diameter pinch roll may comprise a hollow cylindrical axially central section and end sections which are welded together.

The device may preferably include a generally U-shaped frame comprising a pair of substantially parallel side frame members of an aluminum alloy and bearings mounted on the side frame members for rotatably supporting the pinch rolls. The bearings supporting the small-diameter pinch roll may preferably be movable with the small-diameter pinch roll toward and away from the bearings supporting the large-diameter pinch roll. Leaf springs may preferably be mounted on the side frame members for resiliently urging the small-diameter pinch roll against the large-diameter pinch roll.

The back-up roll may preferably be disposed on the side of the small-diameter pinch roll substantially diametrically opposite to the large-diameter pinch roll and resiliently urged against the small-diameter pinch roll.

The above and other objects, features and advantages of the present invention will be made apparent by the following description with reference to the accompanying drawings.

Figure 4:
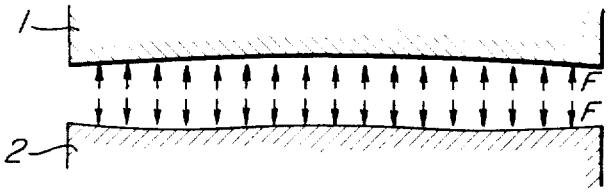
Figure 5:
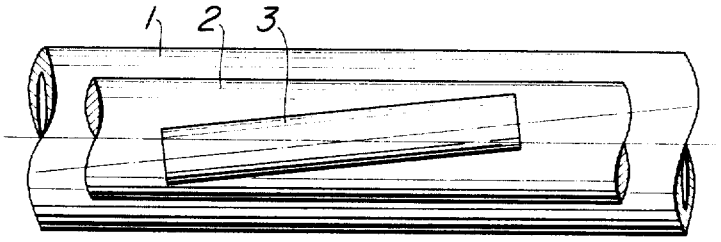

FIG. 4 is an enlarged diagrammatic fragmentary axial sectional view of the large and small diameter roll of the device illustrating deflections of the rolls caused when a carrier sheet with a toner image thereon is passed through the nip between the rolls; and FIG. 5 is an enlarged fragmentary bottom view of a second embodiment of the invention wherein the axis of the back-up roll extends at an angle relative to the axes of the pinch rolls.

Figure 1:
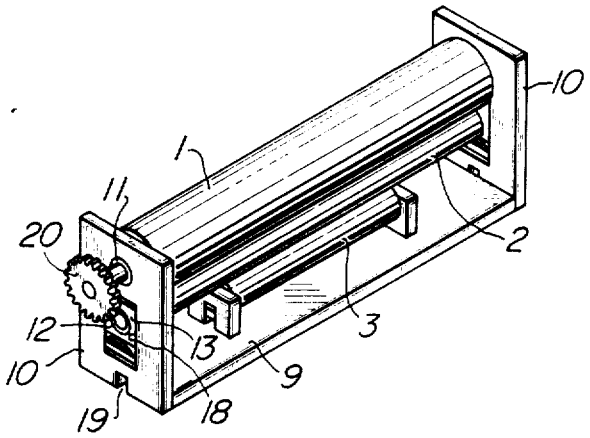
FIG. 1 is a schematic perspective view of an embodiment of a toner image pressure-fixing device according to the present invention.
Figure 2:
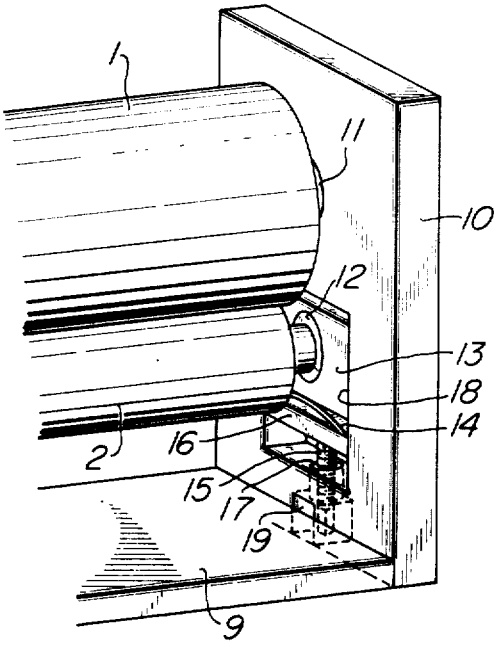
FIG. 2 is an enlarged fragmentary perspective view of the device showing the structural details of a roll supporting mechanism.

Referring first to FIGS. 1 and 2 of the drawings, a toner image pressure-fixing device includes a pair of pinch rolls 1 and 2 having substantially the same length and rotatably mounted on a pair of substantially parallel side frame members 10 so that the rolls 1 and 2 are disposed in rolling engagement with each other. The side frame members 10 cooperate with a base frame member 9 to form a generally U-shaped frame. The two rolls 1 and 2 are shown as being vertically arranged one above the other and thus will be called hereunder "upper roll" and "lower roll", respectively. However, it will be apparent to those in the art that the arrangement of the rolls 1 and 2 is not limited to the arrangement shown and described above and the rolls may alternatively be arranged such that the axes of the rolls are disposed in a plane which is not vertical. The upper roll 1 has a diameter larger than that of the lower roll 2 for the reason to be made apparent later. Since the lower roll 2 has a smaller diameter, the roll tends to be downwardly bent or deflected by a pressure produced when a carrier sheet with a toner image thereon is passed through the nip between the upper and lower rolls 1 and 2. In order to avoid this tendency, a third or back-up roll 3 is mounted on the base frame member 9. The back-up roll 3 has an axial dimension or length smaller than that of the lower roll 2 and is disposed in rolling engagement with that side of the substantially central portion of the lower roll 2 which is substantially diametrically opposite to the nip between the upper and lower rolls 1 and 2. Advantageously, the back-up roll 3 is disposed relative to the lower roll 2 such that the axis of the back-up roll 3 extends at an angle relative to the axis of the lower roll 2, as shown in FIG. 5. This arrangement is effective to more reliably and positively prevent the lower roll 2 from being downwardly deflected than in a case where the axes of the two rolls 2 and 3 are disposed in parallel relationship with each other. However, this arrangement of the axes of the rolls 2 and 3 is not essential for the invention and these rolls may alternatively be arranged such that the roll axes are disposed parallel to each other.

In the illustrated embodiment of the invention, the side frame members 10 are made of an aluminum alloy and are of a substantially similar structure. Thus, it will be sufficient to describe only one of the two frame members 10. Each frame member 10 is of a generally plate-like structure and supports a first beam 11 which is mounted in an opening or hole formed in the member 10 to rotatably support one end of the upper roll 1. A generally rectangular hole or opening 18 is formed in each side frame member 10 between the first bearing 11 and the bottomm end of the frame member. A second bearing 12 which rotatably supports one end of the lower roll 2 is mounted in a slide member 13 which in turn is mounted in the opening 18 for sliding movement therein toward and away from the first bearing 11. The side faces of the opening 18 and the side faces of the slide member 13 are precisely worked so as to prevent movement of the slide member 13 in widthwise direction of the opening 18. A generally arcuate leaf spring 14 is urged against the bottom face of the slide member 13 by a plate-like spring retainer 16 which is supported on an adjust screw 15 having a lower part in threadable engagement with an internally threaded bushing 17 of steel fitted into a vertical hole formed in the bottom face of the opening 18. A cut-out 19 is formed in the bottom edge of the frame member 10 in vertical alignment with the bushing 17. The adjust screw 15 has a bottom end downwardly extending into the cut-out 19 so that the screw is rotated by an operator to adjust the force of the spring 14 for thereby adjusting the pressure at the nip between the upper and lower rolls 1 and 2. The screw threads on the bushing 17 and the adjust screw 15 are designed such that the screw threads can withstand the force produced by the pressure which is produced when a carrier sheet with a toner image thereon is passed through the nip between the upper and lower rolls 1 and 2.

The back-up roll 3 is mounted on the base frame member 9 so that the roll is upwardly urged against the lower roll 2 by leaf springs which are not shown but may be similar in structure to the leaf spring 14. The axial dimension or length of the back-up roll 13 is preferably approximately $\frac{2}{3}$ of that of the lower roll 2.

Figure 3:
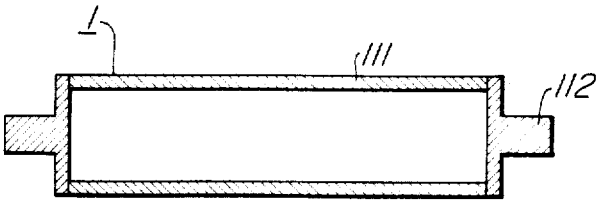
FIG. 3 is an axial sectional view of a large-diameter roll of the device shown in FIG. 1.

The upper roll 1 is connected at one end to a sprocket wheel 20 so that the roll is driven by an appropriate drive means such as an electric motor (not shown) and an endless chain (not shown). The upper roll 1 has an axial section shown in FIG. 3 and is formed of a hollow cylindrical section 111 and a pair of end sections 112 which are rigidly secured or connected together by friction welding. The connection by way of friction welding provides a sufficient mechanical strength particularly in the view point of pressure to which the upper roll 1 is subjected. The upper roll 1 is prepared preferably in such a manner that, after the sections 111 and 112 are connected by friction welding to form the roll, the roll is subjected to quenching and tempering and, thereafter, to surface-grinding and then to plating by which the outer peripheral surface of the cylindrical section 111 is coated with a layer of hard chromium.

The lower roll 2 is formed from a solid cylindrical rod which is subjected to a grinding by means of a centerless grinder and then to a plating by which the peripheral surface of the rod is coated with a layer of hard chromium.

As an example, the specifications of the structural components of the embodiment of the invention are as follows:

The cylindrical section 111 of the upper roll 1 is formed of a cylindrical hollow material of steel having an outer diameter of 55 mm, an inner diameter of 45 mm and a length of 270 mm. The lower roll 2 is formed of a solid cylindrical rod material having a diameter of 20 mm and a length of 270 mm. The back-up roll 3 is formed of a solid cylindrical rod material having a diameter of 20 mm and a length of 170 mm. Each of the side frame members 10 is made from an aluminum alloy and has a width of 65 mm, a height of 110 mm and a thickness of 14 mm. With the structural components of the device as specified above, it has been found that the total pressure force necessary to fix by pressure a toner image to a carrier sheet is approximately 500 kg.

As compared with the prior art toner image pressure-fixing device having a pair of pinch rolls of substantially the same diameter, the lower roll 2 of the device described above is of a diameter smaller than that of the other or upper roll 1 and thus increases the pressure per unit of area exerted by the rolls 1 and 2 to a carrier sheet and toner particles thereon, with a result that the total pressure force required to fix a toner image to the carrier sheet is decreased. Thus, it will be appreciated that the structural components of the device, such as the bearings for supporting rolls and the elements for applying pressure to rolls, can be of sizes which are smaller that those of functionally similar components of the prior art machine. The load applied to the side frame members 10 is also decreased so that the frame members may have a reduced mechanical strength than in the prior art machine and thus can be made from aluminium or an aluminium alloy. As an example, the prior art device was required to apply a total force of 900 kg so as to fix a toner image to a carrier sheet. To the contrary, the device described above and having structural components of dimensions disclosed above is required to apply a total force of 500 kg to fix a similar toner image to a similar carrier sheet. It is believed that this difference is due to the face that the area over which the pinch rolls 1 and 2 of the device according to the present invention contact each other is greatly decreased as compared with the area over which pinch rolls of substantially the same diameter used in the prior art device are engaged with each other.

The feature of the invention that a single back-up roll 3 is provided in rolling engagement with the lower roll 2 to prevent the same from being deflected downwardly is particularly advantageous over the prior art device in which a plurality of support rolls were used for a similar purpose. It will be appreciated that the force to be exerted by the single back-up roll 3 to the lower roll 2 can more easily be adjusted than in the case where a plurality of back-up rolls are used to exert a force for a similar purpose. With respect to the function to support a lower roll against downward deflection, the single back-up roll 3 employed in the device of the present invention is comparable to a plurality of back-up rolls used in the prior art device.

FIG. 4 diagrammatically illustrates the axial distribution of stress produced in the upper and lower rolls 1 and 2 when a carrier sheet of A4 size with a toner image thereon is passed through a nip between the rolls. It will be seen from this illustration that the stress is substantially uniformly distributed over the lengths of the rolls.

The total weight of the device in its entirety of the described and illustrated embodiment of the invention is greatly reduced to substantially 50% of that of the prior art device. This is largely because of the employment of the cylindrical hollow upper roll 1, the use of the side frame members 10 of an aluminum alloy and the use of leaf springs in place of compression coil springs. The employment of leaf springs also contributes to the reduction in the size of the device in its entirety. The space in which the device of the described embodiment is installed may be approximately 70% of the space required by the prior art device of a similar capacity. The decrease in the total force requirement attained by the employment of a combination of large and small diameter pinch rolls [conttributes] *contributes* to the decrease in the power force required to drive the rolls.

The way to secure the roll sections 111 and 112 together is not limited to friction welding. The roll sections 111 and 112 may be connected together by any other conventional securing methods or means, such as shrinkage fitting, screw threads or fasteners such as screws. Thus, the upper roll 1 can be more economically manufactured than rolls used in the prior art devices.

With the present invention, the upper and lower pinch rolls 1 and 2 are arranged such that the roll axes are parallel to each other. This roll arrangement is advantageous in that the rolls 1 and 2 cooperate to produce a force to advance a carrier sheet along a subtantially rectilinear path for thereby preventing the formation of wrinkles in the carrier sheet. It will be noted that an image carrier sheet to be passed through the nip between the pinch rolls 1 and 2 carries thereon a deposit of toner particles which forms a toner image. Such a deposit is of a certain thickness. Thus, an image carrier sheet with a toner image thereon is asymmetric in thicknesswise direction. The difference in size between the upper and lower pinch rolls 1 and 2 in combination with the thicknesswise asymmetry of carrier sheet is effective to reliably and positively fix toner particles onto the carrier sheet to form a clear toner image thereon. In addition, because the back-up roll 3 is in rolling engagement with the axial central part of the lower roll 2, the pressure produced between the pinch rolls 1 and 2 is distributed substantially axially uniformly over the lengths of the rolls, as discussed previously, to advantageously prevent the formation of wrinkles in carrier sheets.

What is claimed is:

1. In a device for fixing a toner image to a carrier sheet by pressure, including a pair of side frame members cooperating with a base frame to form a substantially U-shaped framework, a pair of pinch rolls rotatably mounted on said pair of side frame members and arranged in rolling engagement with each other to provide a nip through which a carrier sheet with a deposit of toner particles thereon is passed to fix the toner particles to the carrier sheet, one of said pinch rolls being of a diameter smaller than that of the other, and a back-up roll disposed in rolling engagement with said smaller diameter pinch roll, the improvement comprising:

spring members mounted within said side frame members to resiliently urge the smaller diameter pinch roll against the larger diameter pinch roll and wherein said back-up roll is in the form of a one-piece roll rotatably mounted on said framework and disposed on the side of said smaller diameter pinch roll substantially diametrically opposite to said larger diameter pinch roll and is resiliently urged against said smaller diameter pinch roll, said back-up roll being so disposed relative to the smaller diameter pinch roll that the axis of said back-up roll extends at an angle relative to the axis of said smaller diameter pinch roll.

2. The device according to claim 1, wherein said back-up roll is mounted on said base frame member.

3. The device according to claims 1 or 2, wherein said spring members are leaf springs.

4. The device according to claims 1 or 2, wherein said pair of side frame members and said base frame member are all made of an aluminum alloy.

5. The device according to claims 1 or 2, wherein said back-up roll has an axial dimension smaller than those of said pinch rolls.

6. The device according to claims 1 or 2, wherein the larger diameter pinch roll is hollow and the smaller diameter pinch roll is solid.

7. The device accordig to claim 6, wherein said large diameter pinch roll comprises a hollow cylindrical section and end sections which are welded together, said larger diameter pinch roll being rotatably mounted on said side frame members at said end sections.

[8. The device according to claim 1, wherein the resiliency of the surface of said back-up roll is approximately the same as the resiliency of the surface of said smaller diameter pinch roll.]

*9. A pressure fixing device wherein a toner image on a surface of a toner image bearing member is fixed thereon by pressure, comprising:*

*first and second rollers for pressing and conveying an image bearing member therebetween; and*

*a third roller press-contacted to said first roller;*

*wherein each of said first, second and third rollers is made of a material suitable for applying sufficient pressure to the image bearing member to fix the image thereon;*

*wherein said first roller is located between said second and third rollers and has a diameter smaller than that of said second roller; and*

*wherein said three rollers are so arranged that, when no pressure for fixing the image is applied, at least two of said rollers have their axes at angles with the conveyance direction of the image bearing member which angles are different from each other, as viewed when facing the surface of the image bearing member.*

*10. A pressure fixing device wherein a toner image on a surface of a toner image bearing member is fixed thereon by pressure, comprising:*

*first and second rollers for pressing and conveying an image bearing member therebetween; and*

*a third roller press-contacted to said first roller;*

*wherein each of said first, second and third rollers is made of a material suitable for applying sufficient pressure to the image bearing member to fix the image thereon;*

*wherein said first roller is located between said second and third rollers and has a diameter smaller than that of said second roller;*

*wherein said three rollers are so arranged that, when no pressure for fixing the image is applied, at least two of said rollers have their axes at angles with the conveyance direction of the image bearing member which angles are different from each other, as viewed when facing the surface of the image bearing member; and*

*wherein said first and third rollers have their axes at angles with the conveyance direction of the image bearing member which angles are different from each other, as viewed when facing the surface of the image bearing member.*

*11. A pressure fixing device in accordance with claim 10 wherein said three rollers are arranged so that the axes of said first and second roller are substantially parallel.*

*12. A pressure fixing device wherein a toner image on a surface of a toner image bearing member is fixed thereon by pressure, comprising:*

*first and second rollers for pressing and conveying an image bearing member therebetween; and*

*a third roller press-contacted to said first roller;*

*wherein each of said first, second and third rollers is made of a material suitable for applying sufficient pressure to the image bearing member to fix the image thereon;*

*wherein said first roller is located between said second and third rollers and has a diameter smaller than that of said second roller; and*

*wherein said three rollers are so arranged that at least two of said rollers have their axes at angles with the conveyance direction of the image bearing member which angles are different from each other, as viewed when facing the surface of the image bearing member.*

*13. A pressure fixing device wherein a toner image on a surface of a toner image bearing member is fixed thereon by pressure, comprising:*

*first and second rollers for pressing and conveying an image bearing member therebetween; and*

*a third roller press-contacted to said first roller;*

*wherein each of said first, second and third rollers is made of a material suitable for applying sufficient pressure to the image bearing member to fix the image thereon;*

*wherein said first roller is located between said second and third rollers and has a diameter smaller than that of said second roller;*

*wherein said three rollers are so arranged that at least two of said rollers have their axes at angles with the conveyance direction of the image bearing member which angles are different from each other, as viewed when facing the surface of the image bearing member; and*

*wherein said first and third rollers have their axes at angles with the conveyance direction of the image bearing member which angles are different from each other, as viewed when facing the surface of the image bearing member.*

*14. A pressure fixing device in accordance with claim 13 wherein said three rollers are arranged so that the axes of said first and second roller are substantially parallel.*

*15. A device for fixing a toner image to a carrier sheet by pressure comprising:*

*a pair of pinch rolls comprising an upper roll and a lower roll disposed in rolling engagement with each other to provide a nip through which a carrier sheet with a deposit of toner particles thereon is passed to fix the toner particles to the carrier sheet;*

*a back-up roll disposed in rolling engagement with said lower roll;*

*means for urging said back-up roll against said lower roll;*

*wherein said lower roll is located between said upper roll and said back-up roll and has a diameter smaller than that of said upper roll; and*

*wherein the upper, lower, and back-up rolls are arranged so that the axis of the back-up roll extends at an angle relative to the axis of the lower roll.*

*16. A device in accordance with claim 15 wherein said upper and lower roll axes are substantially parallel.*

*17. A device for fixing a toner image to a carrier sheet by pressure comprising:*

*a pair of pinch rolls comprising an upper roll and a lower roll disposed in rolling engagement with each other to provide a nip through which a carrier sheet with a deposit of toner particles thereon is passed to fix the toner particles to the carrier sheet;*

*means for urging said lower roll against said upper roll;*

*a back-up roll disposed in rolling engagement with said lower roll;*

*means for urging said back-up roll against said lower roll;*

*wherein said lower roll is located between said upper roll and said back-up roll and has a diameter smaller than that of said upper roll; and*

*wherein the upper, lower, and back-up rolls are arranged so that the axis of the back-up roll extends at an angle relative to the axis of the lower roll.*

*18. A device in accordance with claim 17 wherein said upper and lower roll axes are substantially parallel.*

*19. A device for fixing a toner image to a carrier sheet by pressure comprising:*

*a pair of pinch rolls in rolling engagement with each other to provide a nip through which a carrier sheet with a deposit of toner particles thereon is passed to fix the toner particles to the carrier sheet, one of said pinch rolls being of a diameter smaller than that of the other;*

*a back-up roll disposed in rolling engagement with the smaller diameter pinch roll;*

*means for urging said back-up roll against said smaller diameter pinch roll;*

*wherein said smaller diameter pinch roll is located between the larger diameter pinch roll and said back-up roll; and*

*wherein said smaller diameter pinch roll and said back-up roll are arranged so that the axis of the back-up roll extends at an angle relative to the axis of said smaller diameter pinch roll.*

*20. A device in accordance with claim 19 wherein said pinch roll axes are substantially parallel.*

* * * * *